(12) United States Patent
Yamaguchi et al.

(10) Patent No.: US 7,710,579 B2
(45) Date of Patent: May 4, 2010

(54) MEASURING METHOD AND APPARATUS FOR MEASURING DEPTH OF TRENCH PATTERN

(75) Inventors: Shinji Yamaguchi, Kyoto (JP); Masahiro Horie, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 398 days.

(21) Appl. No.: 11/889,391

(22) Filed: Aug. 13, 2007

(65) Prior Publication Data

US 2008/0049222 A1 Feb. 28, 2008

(30) Foreign Application Priority Data

Aug. 25, 2006 (JP) .......................... P2006-228597
Apr. 9, 2007 (JP) .......................... P2007-101307

(51) Int. Cl.
*G01B 11/02* (2006.01)
(52) U.S. Cl. ..................................... 356/503
(58) Field of Classification Search ................. 356/496, 356/498, 503, 504
See application file for complete search history.

(56) References Cited

U.S. PATENT DOCUMENTS

| | | | |
|---|---|---|---|
| 4,615,620 A | | 10/1986 | Noguchi et al. |
| 4,826,270 A | | 5/1989 | Opheij et al. |
| 5,087,121 A | * | 2/1992 | Kakuchi et al. ............... 356/73 |
| 5,440,141 A | * | 8/1995 | Horie ..................... 250/559.27 |
| 6,275,297 B1 | * | 8/2001 | Zalicki ....................... 356/496 |
| 6,388,756 B1 | * | 5/2002 | Ho et al. ..................... 356/626 |
| 6,744,521 B1 | | 6/2004 | Hertling et al. |
| 7,120,553 B2 | * | 10/2006 | Benvegnu ................... 702/172 |
| 7,307,735 B2 | * | 12/2007 | Hecht et al. ................. 356/504 |
| 2002/0164829 A1 | | 11/2002 | Otsubo et al. |

FOREIGN PATENT DOCUMENTS

CN 1429332 7/2003

(Continued)

OTHER PUBLICATIONS

Korean Office Action issued in Korean Patent Application No. KR 10-2007-0080192, dated Jul. 15, 2008.

(Continued)

*Primary Examiner*—Michael A Lyons
(74) *Attorney, Agent, or Firm*—McDermott Will & Emery LLP

(57) ABSTRACT

In a trench shape measuring apparatus, a substrate having a trench pattern extending in a predetermined trench direction on a measurement area is held by a holding part. A light emission part applies illumination light to the measurement area and reflected light of the illumination light from the measurement area is spectrally dispersed by a diffraction grating of a spectroscope, to acquire a measured spectral reflectance. Since the diffraction grating is arranged so that an angle formed between a direction on the substrate corresponding to a grating direction of the diffraction grating and the trench direction becomes 45 degrees, even if an oscillation direction of the reflected light from the substrate is limited by influence of the trench pattern, it is possible to accurately obtain a spectral reflectance of the measurement area without influence of polarization of the reflected light and obtain a depth of the trench pattern with accuracy.

32 Claims, 6 Drawing Sheets

FOREIGN PATENT DOCUMENTS

| | | |
|---|---|---|
| JP | 60-136324 | 7/1985 |
| JP | 63-085305 | 4/1988 |
| JP | 1-223412 | 9/1989 |
| JP | 6-65963 | 8/1994 |
| JP | 2000-292129 | 10/2000 |
| JP | 2001-118832 | 4/2001 |
| JP | 2001-221617 | 8/2001 |
| JP | 2003-258052 | 9/2003 |
| JP | 3740079 | 11/2005 |

OTHER PUBLICATIONS

Chinese Office Action issued in Chinese Patent Application No. ZL 200710140995.1, mailed Dec. 23, 2009.

* cited by examiner

MEASURING METHOD AND APPARATUS FOR MEASURING DEPTH OF TRENCH PATTERN

BACKGROUND OF THE INVENTION

1. Field of the Invention

The present invention relates to a technique for measuring a depth of a trench pattern formed on a substrate.

2. Description of the Background Art

A method of nondestructively measuring a depth of a trench pattern (for example, a set of a plurality of trenches extending in a direction) formed on a substrate by using a spectral interference method has been conventionally suggested. For example, Japanese Examined Patent Publication No. 6-65963 discloses a method of measuring a depth of a trench, where light is applied to a substrate having a trench, reflected light from the substrate is spectrally dispersed to obtain a spectrum, and then a cycle of peak in the spectrum caused by an optical path difference between the uppermost face of the substrate and the bottom face of the trench is specified by a maximum entropy method. Japanese Patent Gazette No. 3740079 also discloses a method of obtaining a depth of an etching trench. In the method, when the depth of the etching trench formed by etching a film on a substrate is measured, first, a spectrum which is obtained relatively to the film on the substrate with an original film thickness and a theoretical spectrum in a case where it is supposed that a thinner film than the original film thickness is formed on the substrate are acquired. The thinner film corresponds to the bottom face of the etching trench (that is to say, the depth of the trench is the difference between the original film thickness and a film thickness of the thinner film), and the spectrum of the film with the original film thickness and the spectrum of the thinner film are mixed with a mixture ratio in accordance with an area ratio of the etching trench in design, to acquire a plurality of mixture spectra corresponding to the etching trenches of a plurality of depths, respectively. The actual spectrum obtained from the substrate is compared with the plurality of mixture spectra to obtain the depth of the etching trench.

A spectroscope having a diffraction grating is frequently used in acquisition of a spectral reflectance. In the diffraction grating, a diffraction efficiency which is a ratio between an incident intensity and a reflected intensity of light is largely different between p-polarized light and s-polarized light depending on a wavelength of the light. In measurement of the depth of the trench pattern formed on the substrate, an oscillation direction of the reflected light from the substrate is limited by influence of the trench pattern in accordance with various conditions (that is to say, the reflected light from the substrate becomes polarized light). Thus, there are situations where the spectral reflectance cannot be accurately obtained on the basis of the reflected light from the substrate depending on the oscillation direction of the reflected light which enters the diffraction grating, and the depth of the trench pattern cannot be obtained with accuracy.

In measurement of the depth of the trench pattern on the substrate having a single layer film or a multilayer film, when a measured spectral reflectance acquired from the reflected light from the substrate and calculated spectral reflectances obtained by a computation are compared, the influence of the film in the calculated spectral reflectances needs to be considered because the measured spectral reflectance is affected by the film. However, in a case where a film on the substrate is extremely thin (for example, a film thickness of 10 nanometer (nm)), if it is tried to compare the measured spectral reflectance with the calculated spectral reflectances where a film thickness of the film is also included in parameters to obtain the film thickness of the film and the depth of the trench pattern, values of the parameters cannot be determined with accuracy. This is the same as in the case where the multilayer film is formed on the substrate.

SUMMARY OF THE INVENTION

The present invention is intended for a measuring method of measuring a depth of a trench pattern formed on a substrate. It is an object of the present invention to obtain a depth of the trench pattern with accuracy.

The measuring method in accordance with the present invention comprises a) applying illumination light to a substrate having a measurement area where a trench pattern extending in a predetermined direction is formed; b) spectrally dispersing reflected light of the illumination light from the substrate by a diffraction grating which is arranged so that an angle formed between a direction on the substrate which corresponds to a grating direction of the diffraction grating and the predetermined direction becomes equal to or greater than 40 degrees and equal to or smaller than 50 degrees; c) receiving light dispersed in the step b) on a detector to acquire a measured spectral reflectance of the measurement area; and d) comparing the measured spectral reflectance with calculated spectral reflectances which are obtained by a computation where at least a depth of the trench pattern and an area ratio of a bottom face of the trench pattern are used as parameters, to determine values of the parameters. According to the present invention, the depth of the trench pattern can be obtained with accuracy.

According to a preferred embodiment of the present invention, the illumination light is directed to the substrate through an objective lens having a numerical aperture which is equal to or greater than 0.05 and equal to or smaller than 0.1 in the step a) and it is possible to surely apply the illumination light to the bottom face of the trench pattern. More preferably, an area ratio of an uppermost face in a surface of the substrate is included in the parameters in the step d), and a sum of a value obtained by multiplying a complex amplitude reflectance which is theoretically calculated on the basis of light from the bottom face of the trench pattern by the area ratio of the bottom face and a value obtained by multiplying a complex amplitude reflectance which is theoretically calculated on the basis of light from the uppermost face by the area ratio of the uppermost face, is made to a complex amplitude reflectance in the measurement area, to obtain the calculated spectral reflectances. It is thereby possible to neglect influence of reflected light from side faces of the trench pattern and to easily obtain the depth of the trench pattern, the area ratio of the bottom face, and the area ratio of the uppermost face.

Another preferred measuring method comprises a) applying illumination light to a substrate having a measurement area where a trench pattern extending in a predetermined direction is formed; b) spectrally dispersing reflected light of the illumination light from the substrate by a diffraction grating, the reflected light being directed to the diffraction grating through a depolarizer; c) receiving light dispersed in the step b) on a detector to acquire a measured spectral reflectance of the measurement area; and d) comparing the measured spectral reflectance with calculated spectral reflectances which are obtained by a computation where at least a depth of the trench pattern and an area ratio of a bottom face of the trench pattern are used as parameters, to determine values of the parameters. This makes it possible to obtain the depth of the trench pattern with accuracy.

Still another preferred measuring method comprises a) applying illumination light to an auxiliary area of a substrate which has a measurement area where a trench pattern is formed and the auxiliary area where the trench pattern does not exist, at least one film being formed on both the measurement area and the auxiliary area; b) obtaining each film thickness of one or more films included in the at least one film by acquiring a spectral reflectance of the auxiliary area on the basis of reflected light of the illumination light from the auxiliary area; c) applying illumination light to the measurement area; d) acquiring a measured spectral reflectance of the measurement area on the basis of reflected light of the illumination light from the measurement area; and e) comparing the measured spectral reflectance with calculated spectral reflectances which are obtained, with use of the each film thickness obtained in the step b), by a computation where at least a depth of the trench pattern and an area ratio of a bottom face of the trench pattern are used as parameters, to determine values of the parameters. In the substrate having the at least one film, it is thereby possible to obtain the depth of the trench pattern with high accuracy by obtaining the film thickness in the area where the trench pattern does not exist.

The present invention is also intended for a measuring apparatus for measuring a depth of a trench pattern formed on a substrate.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
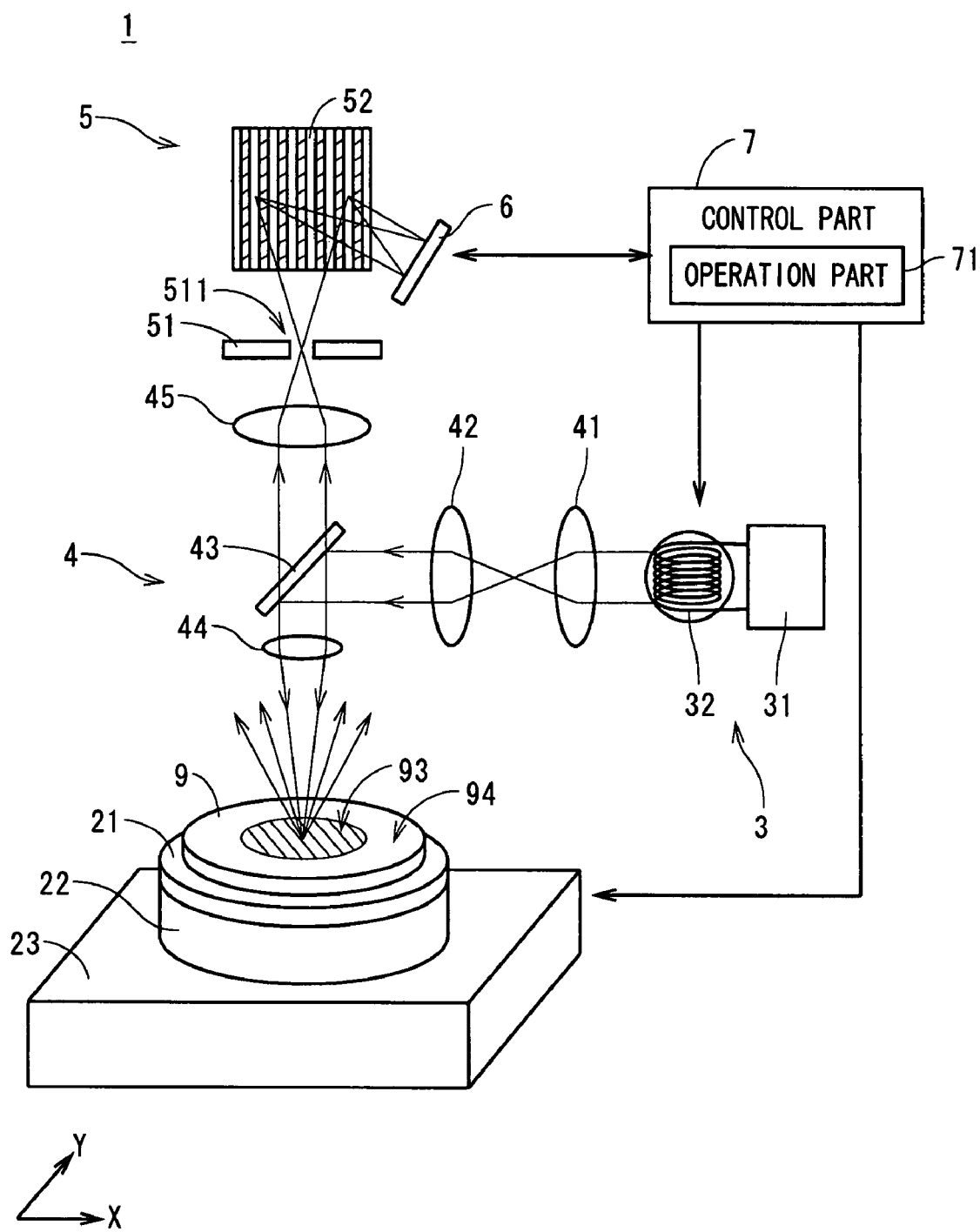
FIG. 1 is a view showing a constitution of a trench shape measuring apparatus in accordance with the first preferred embodiment.

FIG. 1 is a view showing a construction of a trench shape measuring apparatus 1 in accordance with the first preferred embodiment of the present invention. The trench shape measuring apparatus 1 is for acquiring information about a shape of a trench pattern formed on a semiconductor substrate 9 such as a depth of the trench pattern. Actually, a film thickness of a film formed on the substrate 9 is also measured to acquire the information about the shape of the trench pattern in the trench shape measuring apparatus 1. The trench pattern on the substrate 9 is a set of a plurality of trenches extending in a direction (i.e., the trench pattern is a pattern having diffraction grating shape) in the preferred embodiment.

The trench shape measuring apparatus 1 has a holding part 21 for holding a disk-shaped substrate 9 on which the trench pattern is formed, a rotation mechanism 22 for rotating the holding part 21 around an axis in a vertical direction, a holding part moving mechanism 23 for moving the holding part 21 in the X direction and the Y direction which are the horizontal directions with interposing the rotation mechanism 22, a light emission part 3 for emitting illumination light, an optical system 4 which directs the illumination light from the light emission part 3 to the substrate 9 and receives reflected light from the substrate 9, a spectroscope 5 for spectrally dispersing the reflected light which is directed by the optical system 4, a detector 6 for receiving light spectrally dispersed by the spectroscope 5 to obtain a spectral reflectance, and a control part 7 which has an operation part 71 for performing various computations and controls the whole trench shape measuring apparatus 1. The holding part moving mechanism 23 includes a X direction moving mechanism and a Y direction moving mechanism which are not shown and each moving mechanism is provided with a combination of a motor, a ball screw, and guide rails.

The light emission part 3 has a light source 32 connected to a power supply 31 and emits illumination light (white light). The illumination light from the light source 32 is directed to a half mirror 43 through lenses 41, 42 which belong to the optical system 4, and the illumination light reflected on the side of the substrate 9 is applied to the substrate 9 through an objective lens 44. Since a numerical aperture (NA) of the objective lens 44 is made to be equal to or greater than 0.05 and equal to or smaller than 0.1, the illumination light is applied to the substrate 9 approximately perpendicularly to the substrate 9 as a nearly parallel light.

Reflected light of the illumination light from the substrate 9 is captured by the objective lens 44 and enters the spectroscope 5 through the half mirror 43 and the lens 45. The spectroscope 5 has an opening plate 51 having a pinhole 511, and the reflected light passing through the pinhole 511 is applied to a diffraction grating 52 in which a plurality of grooves extending in a direction are formed on its surface (areas of the grooves are hatched in FIG. 1 and hereinafter, the extending direction of the grooves is referred to as "grating direction"). In FIG. 1, the number of the grooves in the diffraction grating 52 is extremely smaller than that formed actually. At this time, if linearly polarized light whose oscillation direction is the Y direction at a main surface of the substrate 9 is emitted from the position of the substrate 9, the linearly polarized light enters the diffraction grating 52 so that its oscillation direction is parallel to or perpendicular to the grating direction of the diffraction grating 52. In other words, the diffraction grating 52 is arranged so that a direction on the substrate 9 which corresponds to the grating direction of the diffraction grating 52 is parallel to or perpendicular to the Y direction. The diffraction grating 52 spectrally disperses the reflected light passing through the pinhole 511, and spectrally dispersed light is directed to different positions on a receiving surface of the detector 6 in accordance with wavelengths. Detailed constituent elements in the spectroscope 5 are omitted in FIG. 1.

The receiving surface of the detector 6 has an array of a plurality of light receiving elements, and light of each wavelength included in a predetermined wavelength band (hereinafter, referred to as "measurement wavelength band") is received by the corresponding light receiving element to acquire an intensity of the light. In the trench shape measuring apparatus 1, an intensity of light is obtained in advance in the case that the holding part 21 is provided with a mirror irradiated with the illumination light and reflected light from the mirror is applied to each light receiving element of the detector 6 through the spectroscope 5. Thus, each light receiving element obtains a ratio between the intensity of light acquired from the substrate 9 and the intensity of light acquired with the mirror as a (relative) reflectance. As a result, a set of a plurality of reflectances which respectively correspond to a plurality of wavelengths included in the measurement wavelength band is obtained as the spectral reflectance. The spectral reflectance obtained in the detector 6 is referred to as a "measured spectral reflectance" in the following description. A computation for obtaining the ratio between the intensity of the light acquired from the substrate 9 and that acquired with the mirror may be performed outside the detector 6.

Next discussion will be made on an operation flow for measuring the shape of the trench pattern in the trench shape measuring apparatus 1, with reference to FIG. 2. In measurement of the trench pattern shape, first, the substrate 9 to be measured is loaded into the trench shape measuring apparatus 1 by a carrier device which is located outside the trench shape measuring apparatus 1, and it is placed and held on the holding part 21 (Step S10). At this time, in a predetermined measurement area 93 on the substrate 9, the trench pattern is formed so as to extend in a direction predetermined relatively to a reference portion formed on the substrate 9 (i.e., the portion is formed for determining a direction of the substrate 9 and for example, it is a notch, an orientation flat, or the like). In the trench shape measuring apparatus 1, the substrate 9 is held on the holding part 21 with the reference portion contacting positioning pins provided in the holding part 21 so that the substrate 9 is oriented in a predetermined direction. Therefore, the orientation of the trench pattern within the measurement area 93 of the substrate 9 which is held on the holding part 21 is made to any angle in the range of 45 degrees ±5 degrees (from 40 to 50 degrees) with respect to the Y direction (preferably, the trench pattern is tilted by 45 degrees with respect to the Y direction). In other words, an angle formed between a direction on the substrate 9 which corresponds to the grating direction of the diffraction grating 52 and the extending direction of the trench pattern is made to be equal to or greater than 40 degrees and equal to or smaller than 50 degrees (preferably, it is made to 45 degrees). In the following discussion, the extending direction of the trench pattern is also referred to as a "trench direction".

Subsequently, it is confirmed whether or not a process for accessorily measuring the film thickness of the film formed on the substrate 9 (hereinafter, referred to as "auxiliary film thickness measurement") is performed before acquisition of the information relating to the shape of the trench pattern (the information includes the depth of the trench pattern and the like, and hereinafter referred to as "trench pattern information") (Step S11). Necessity of the auxiliary film thickness measurement is determined in accordance with a film structure of the substrate 9. For example, when an extremely thin single layer film or a multilayer film is formed on the substrate 9, the auxiliary film thickness measurement is performed to improve measurement accuracy of the trench pattern information. In the following description, the extremely thin single layer film shall be formed on the substrate 9 and the auxiliary film thickness measurement is performed (Step S12).

Figure 3:
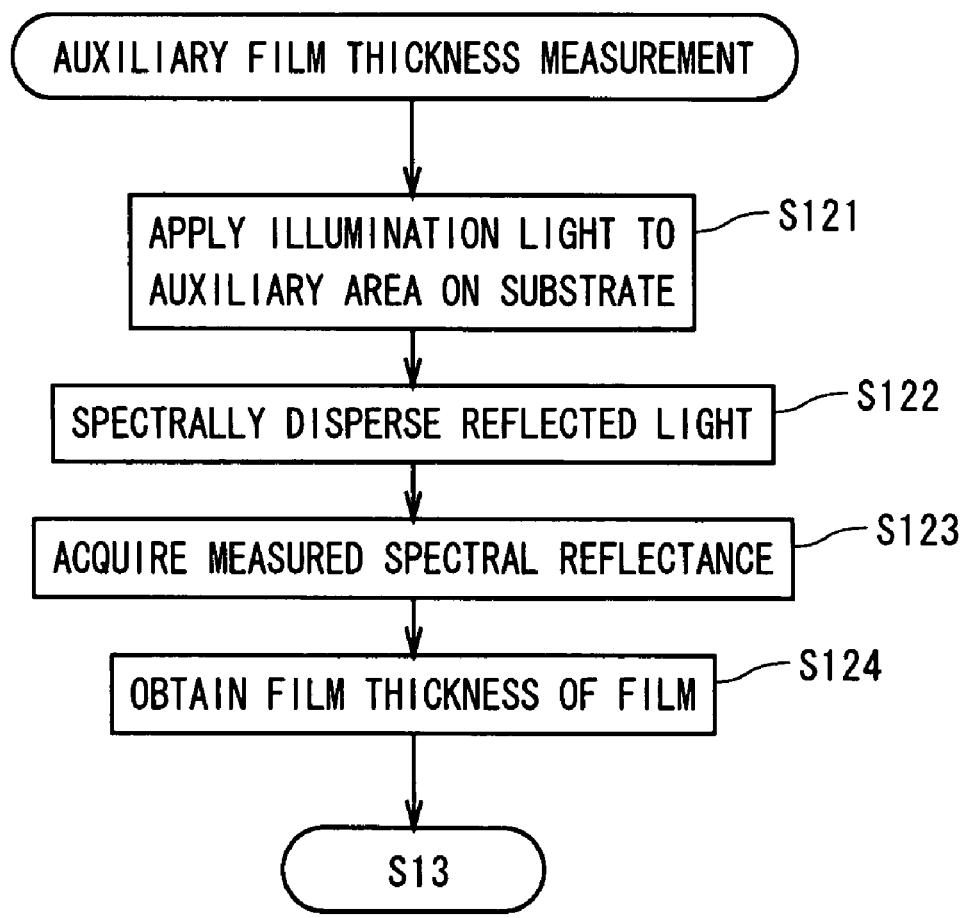
FIG. 3 is a flowchart showing an operation flow of an auxiliary film thickness measurement.
Figure 4:
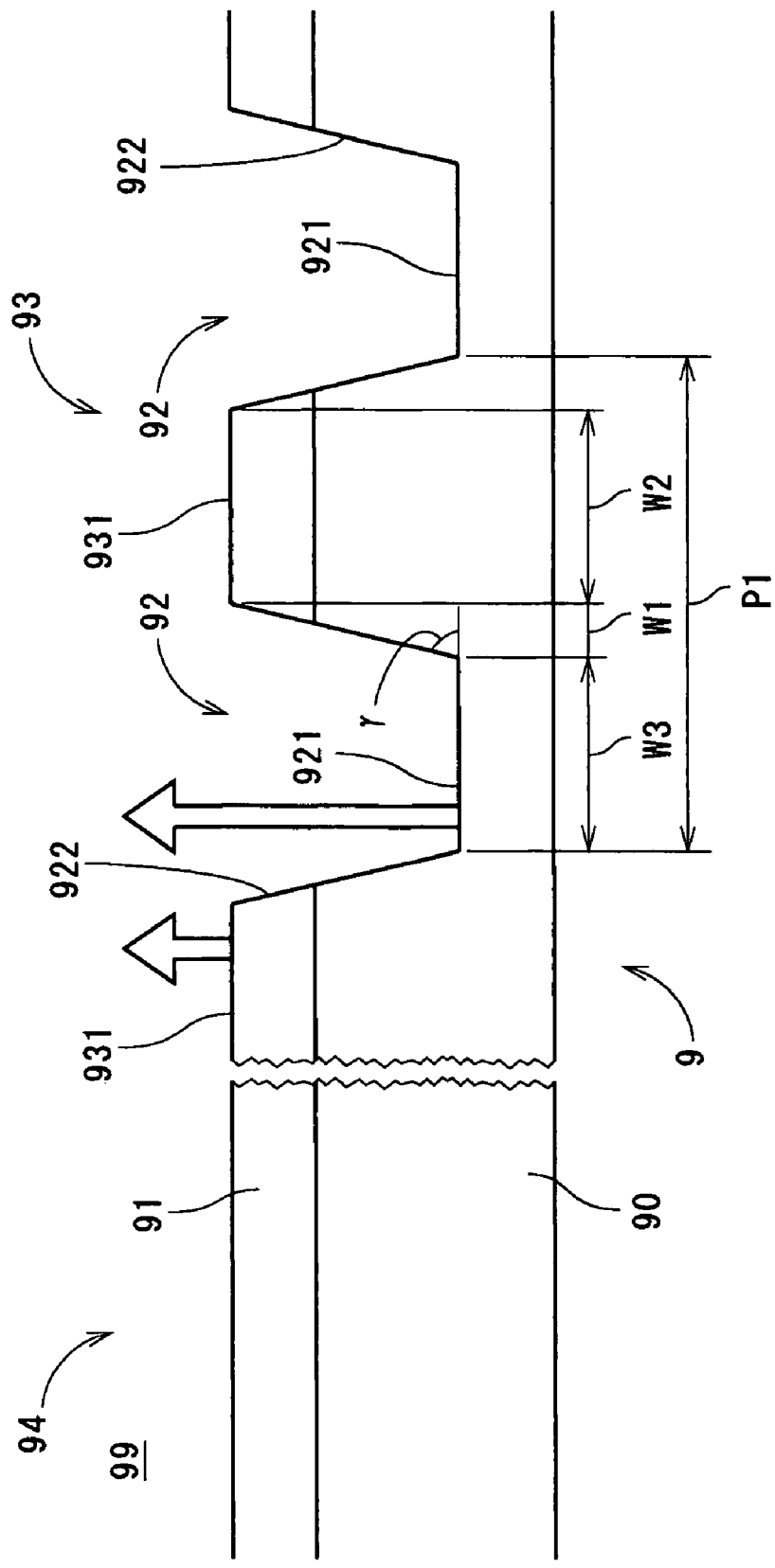
FIG. 4 is a view showing a cross section of a substrate perpendicular to a trench direction.

FIG. 3 is a flowchart showing an operation flow of the auxiliary film thickness measurement. FIG. 4 is a view showing a cross section of the substrate 9 which is perpendicular to the trench direction. Hatching of the cross section of the substrate 9 is not shown in FIG. 4 (same as in FIG. 5 which is later discussed).

As shown in FIG. 4, a thin film 91 of silicon oxide ($SiO_2$) (A film thickness of the film is, for example, 10 nanometer (nm), and the film thickness of the film 91 in FIG. 4 is thicker than that of the actual film. The same is applied to FIG. 5 later discussed) is formed on the surface of the substrate 9, and a plurality of trenches 92 which are arranged at a regular pitch P1 in a direction perpendicular to the trench direction is formed by etching a main body 90 of the substrate 9 which is made of the film 91 and silicon (Si). Actually, an area 94 where the trench pattern does not exist (the area 94 is a so-called solid area, for acquiring information for assisting measurement of the trench pattern shape, and it is hereinafter referred to as "auxiliary area 94") is formed on the main surface of the substrate 9, other than the measurement area 93 having the trench pattern which is an object area to be measured. In the auxiliary film thickness measurement, after the auxiliary area 94 is arranged at an irradiation position of the illumination light by the holding part moving mechanism 23, the illumination light is emitted from the light emission part 3 and applied to the auxiliary area 94 (Step S121). The optical system 4 directs reflected light from the auxiliary area 94 to the spectroscope 5, it spectrally disperses the reflected light (Step S122), and spectrally dispersed light is received on the detector 6 to acquire a measured spectral reflectance of the auxiliary area 94 (Step S123).

In the trench shape measuring apparatus 1, calculated spectral reflectances for the auxiliary film thickness measurement are obtained and prepared in advance, and discussion will be made on the calculated spectral reflectances used in the auxiliary film thickness measurement. In acquisition of the calculated spectral reflectances, first, given that the film 91 has a certain film thickness d, a reflectance R relative to light with a wavelength λ is obtained by substituting each of the following values into the equation 1, where N is a refractive index of the film 91, θ is an incident angle of the light (illumination light) to the film 91, λ is the wavelength of the light, $r_{01}$ is an amplitude reflectance in an interface between an air 99 and the film 91, and $r_{12}$ is an amplitude reflectance in an interface between the film 91 and the main body 90 of the substrate 9. The incident angle θ of the light to the film 91 is 0 degree in the preferred embodiment (same as in the equations 3 and 4 which are later discussed). Further, r without a numerical subscript in the equation 1 represents a complex amplitude reflectance and β represents a film phase thickness (which is the same as in the equations 3 and 4 discussed later).

$$R = |r|^2 = \left| \frac{r_{01} + r_{12}\exp(-i2\beta)}{1 + r_{01}r_{12}\exp(-i2\beta)} \right|^2 \qquad \text{Eq. 1}$$

where $\beta = 2\pi dN\cos\theta/\lambda$

Actually, the reflectance R is obtained for each of the plurality of wavelengths included in the measurement wavelength band, and a set of a plurality of reflectances R with respect to the plurality of wavelengths is obtained as the calculated spectral reflectance. In the trench shape measuring apparatus 1, a plurality of calculated spectral reflectances relative to a plurality of film thicknesses are acquired by repeating the above computation with changing an assumed film thickness of the film 91.

The measured spectral reflectance of the auxiliary area 94 which is obtained in Step S123 is compared with the plurality of calculated spectral reflectances, and a calculated spectral reflectance approximating to the measured spectral reflectance is specified from these calculated spectral reflectances to obtain the film thickness of the film 91 (Step S124). Specifically, a degree of similarity Err is obtained by the equation 2 where, with respect to a certain wavelength, Rc is a reflectance represented by the calculated spectral reflectance and Rm is a reflectance represented by the measured spectral reflectance. In the equation 2, mean (A) is an average of a plurality of A which are obtained relatively to the plurality of wavelengths included in the measurement wavelength band.

$$Err = \text{mean}((Rc - Rm)^2) \qquad \text{Eq. 2}$$

In the trench shape measuring apparatus 1, the calculated spectral reflectance where the degree of similarity Err is minimum is specified, and a film thickness relative to the above calculated spectral reflectance is made to the film thickness of the film 91 in the auxiliary area 94 of the substrate 9. In a case where the degree of similarity Err is equal to or smaller than a predetermined value or the like, there may be a case where the nonlinear optimization method such as the Gauss-Newton method or the Levenberg-Marquardt method is used as necessary, and the calculated spectral reflectance where the degree of similarity Err becomes greater than the predetermined value is acquired while converging the degree of similarity Err, to obtain the film thickness of the film 91.

Figure 2:
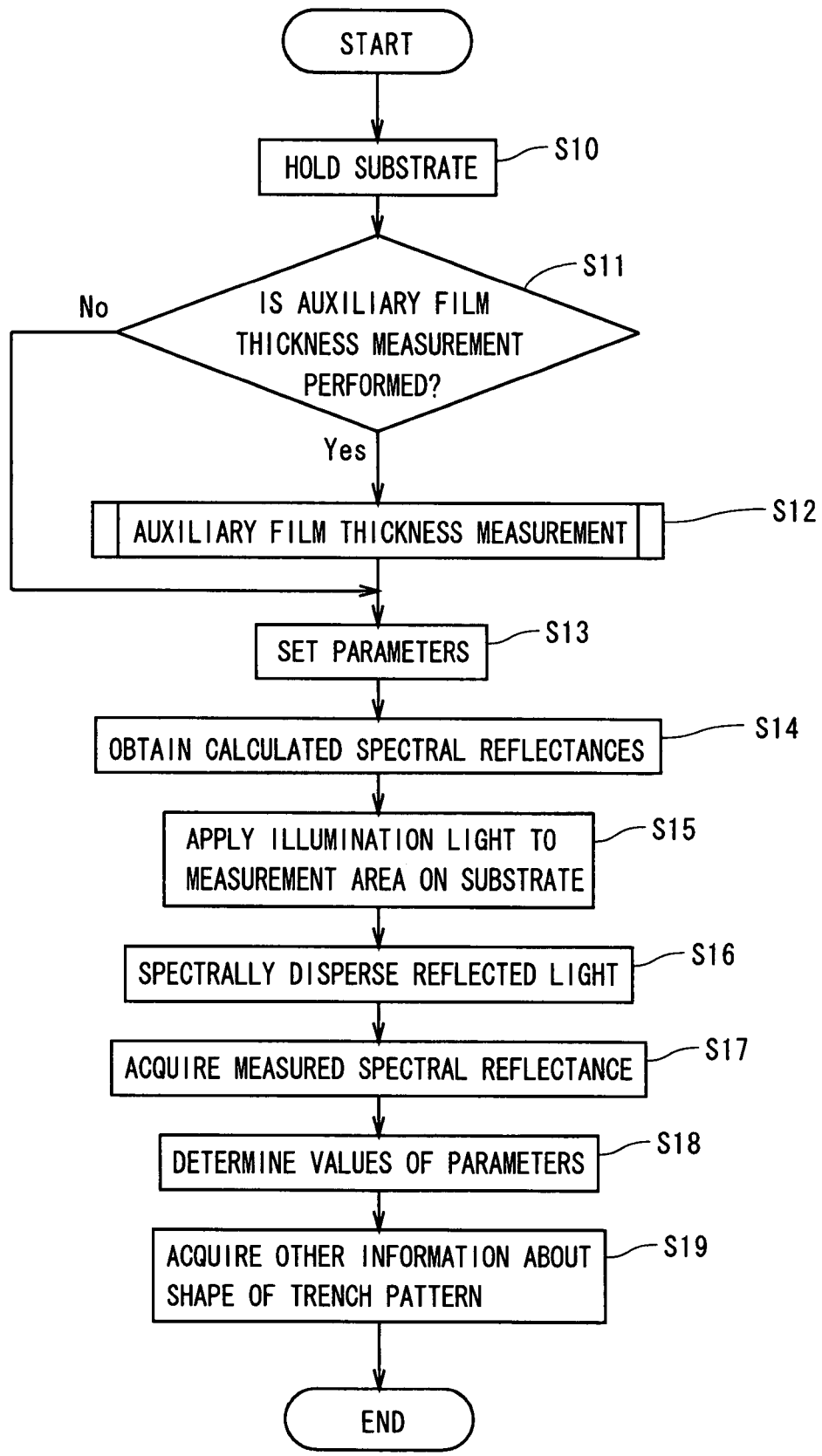
FIG. 2 is a flowchart showing an operation flow for measuring a shape of a trench pattern.

As discussed above, after obtaining the film thickness of the film 91 of the substrate 9, setting of parameters (so-called generation of a measurement recipe) in a computation of calculated spectral reflectances in acquisition of the trench pattern information is performed (these calculated spectral reflectances are different from those in the auxiliary film thickness measurement) (FIG. 2: Step S13). Specifically, the depth of the trench pattern (i.e., the depth of a trench 92), an area ratio of a set of bottom faces 921 which are formed in a plurality of trenches 92 in the measurement area 93, and an area ratio of a set of a plurality of uppermost faces (which are areas having the same height as the surface of the auxiliary area 94) 931 are used as parameters, and an initial value and a plurality of values of changes (i.e., the differences from the initial value) in each of the parameters are set in the operation part 71 and the film thickness of the film 91 which is obtained in Step S12 is also set in the operation part 71. Since a plurality of values are set to each parameter, the degree of similarity is suppressed to fall into a local optimum in calculation of the degree of similarity which is later discussed. In the following description, the area ratio of the set of the plurality of bottom faces 921 and the area ratio of the set of the plurality of uppermost faces 931 are simply referred to as "the area ratio of the bottom face 921" and "the area ratio of the uppermost face 931".

Subsequently, the calculated spectral reflectances in acquisition of the trench pattern information are obtained (Step S14). Specifically, a complex amplitude reflectance $r_I$ of the uppermost face 931 relative to light with a wavelength λ is obtained by substituting each of the following values into the equation 3, where d is a value to which the film thickness of the film 91 is set, N is a refractive index of the film 91, θ is an incident angle of the light (illumination light) to the film 91, λ is the wavelength of the light, $r_{01}$ is an amplitude reflectance in an interface between the air 99 and the film 91, and $r_{12}$ is an amplitude reflectance in an interface between the film 91 and the main body 90 of the substrate 9.

$$r_I = \frac{r_{01} + r_{12}\exp(-i2\beta)}{1 + r_{01}r_{12}\exp(-i2\beta)} \qquad \text{Eq. 3}$$

where $\beta = 2\pi dN\cos\theta/\lambda$

Figure 5:
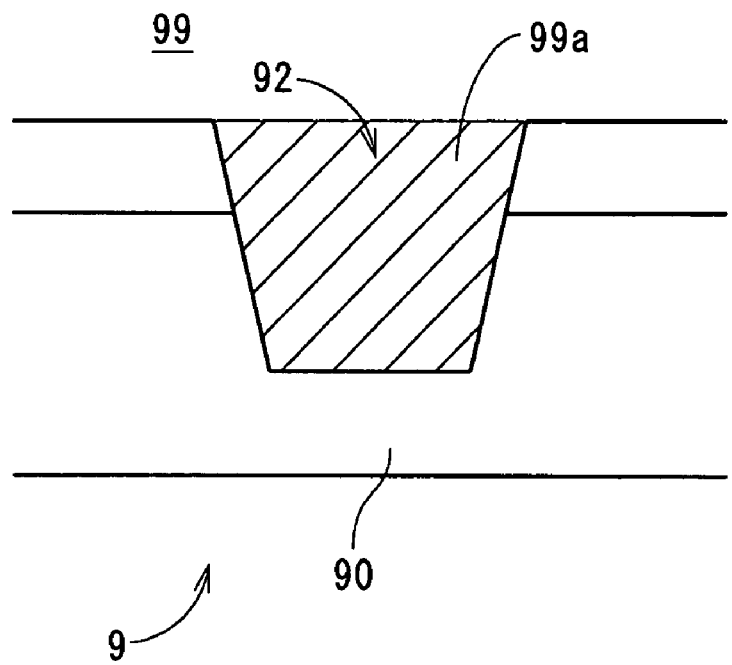
FIG. 5 is a view to explain a process for obtaining a complex amplitude reflectance of a bottom face.

With respect to the bottom face 921, assuming that the trench 92 is a film 99a of air having the film thickness t which is equal to the initial value of the depth of the trench 92, as shown by hatching in FIG. 5, a complex amplitude reflectance $r_{II}$ of the bottom face 921 relative to light with a wavelength λ is obtained by substituting each of the following values into the equation 4, where N is a refractive index of the film 99a, θ is an incident angle of the light (illumination light) to the film 99a, λ is the wavelength of the light, $r_{01}$ is an amplitude reflectance in an interface between the air 99 and the film 99a, and $r_{12}$ is an amplitude reflectance in an interface between the film 99a and the main body 90 of the substrate 9. Actually, in the equation 4, the refractive index N is 1 and the amplitude reflectance $r_{01}$ in an interface between the air 99 and the film 99a is 0.

$$r_{II} = \frac{r_{01} + r_{12}\exp(-i2\beta)}{1 + r_{01}r_{12}\exp(-i2\beta)} \qquad \text{Eq. 4}$$

where $\beta = 2\pi tN\cos\theta/\lambda$

Figure 6:
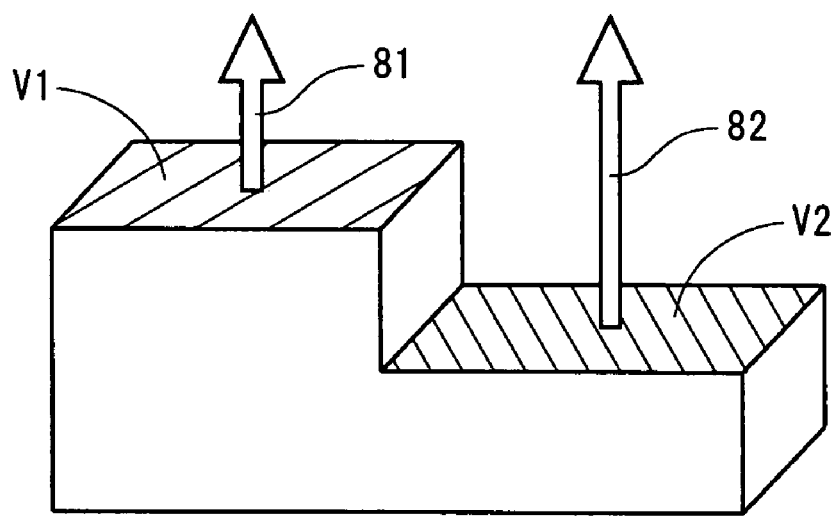
FIG. 6 is a view to explain the complex amplitude reflectance in the whole area.

As abstractly shown by arrows 81, 82, interference occurs by an optical path difference between lights from areas V1, V2 which are differently hatched in FIG. 6. A complex amplitude reflectance $r_v$ relative to light with a certain wavelength in the whole of the areas V1, V2 is obtained by the equation 5, where $A_{v1}$ and $A_{v2}$ are area ratios of the areas V1, V2, respectively, and $r_{v1}$ and $r_{v2}$ are complex amplitude reflectances relative to the light with the wavelength in the areas V1, V2, respectively.

$$rv = rv_1 \times Av_1 + rv_2 \times Av_2 \qquad \text{Eq. 5}$$

Actually, inclining side faces 922 of the trench 92 exist in the measurement area 93 on the right side of FIG. 4, in addition to the uppermost faces 931 and the bottom faces 921. Referring to areas of the side faces 922 seen along a direction perpendicular to the substrate 9 as side areas, a complex amplitude reflectance $r_{sample}$ relative to light with a certain wavelength in the measurement area 93 is obtained by the equation 6, where $A_I$, $A_{II}$ and $A_{III}$ are an area ratio of the uppermost face 931 in the measurement area 93, an area ratio of the bottom face 921 in the trench 92, and an area ratio of the side areas in the trench 92, respectively (accurately, an area ratio of the set of the plurality of uppermost faces 931 in the measurement area 93, an area ratio of the set of the plurality of bottom faces 921 in the plurality of trenches 92, and an area ratio of a set of side areas in the plurality of trenches 92) (the sum of the area ratios $A_I$, $A_{II}$ and $A_{III}$ is 1) and $r_I$, $r_{II}$ and $r_{III}$ are a complex amplitude reflectance of the uppermost face 931 relative to the light with the wavelength, a complex amplitude reflectance of the bottom face 921 in the trench 92, and a complex amplitude reflectance of the side areas, respectively.

$$r_{sample} = r_I \times A_I + r_{II} \times A_{II} + r_{III} \times A_{III} \qquad \text{Eq. 6}$$

In the preferred embodiment, as discussed later, since the illumination light is applied to the substrate 9 through the objective lens 44 with the small numerical aperture and the reflected light from the substrate 9 enters the optical system 4 through the objective lens 44, it is possible to neglect light reflected from the side faces 922 (that is to say, the light hardly enters the optical system 4), and make the complex amplitude reflectance $r_{III}$ in the side areas to 0. Therefore, by substituting initial values into the area ratio $A_I$ of the uppermost face 931 and the area ratio All of the bottom face 921 in the equation 6, and also substituting the complex amplitude reflectance $r_I$ of the uppermost face 931 and the complex amplitude reflectance $r_{II}$ of the bottom face 921, which are relative to the light with the wavelength λ and obtained by the equations 3 and 4, into the equation 6, obtained is the complex amplitude reflectance $r_{sample}$ of the measurement area 93 relative to the light with the wavelength λ in a case where the depth of the trench 92, the area ratio of the bottom face 921, and the area ratio of the uppermost face 931 in the parameters are made to the initial values, respectively. Then, as shown in the equation 7, a reflectance $R_{sample}$ of the measurement area 93 relative to the light with the wavelength λ when each parameter is made to the initial value, is obtained by acquiring a square value of the absolute value of the complex amplitude reflectance $r_{sample}$.

$$R_{sample}=|r_{sample}|^2 \qquad \text{Eq. 7}$$

Actually, the reflectance $R_{sample}$ is obtained for each of the plurality of wavelengths included in the measurement wavelength band and a set of a plurality of reflectances $R_{sample}$ with respect to the plurality of wavelengths is acquired as the calculated spectral reflectance when each parameter is made to the initial value. In the trench shape measuring apparatus 1, the above computation is repeated while sequentially changing a value of each parameter to the initial value and values which are away from the initial value by the values of changes (hereinafter, collectively referred to as "set values"), to acquire the plurality of calculated spectral reflectances which respectively correspond to all combinations of the set values with respect to the depth of the trench 92, the area ratio of the bottom face 921, and the area ratio of the uppermost face 931.

After obtaining the plurality of calculated spectral reflectances, the irradiation position of the illumination light on the substrate 9 is arranged within the measurement area 93 by the holding part moving mechanism 23, the illumination light is emitted from the light emission part 3 and applied to the measurement area 93 on the substrate 9 (Step S15). At this time, since the illumination light is directed to the substrate 9 through the objective lens 44 with the small numerical aperture as discussed above, it is possible to surely perform application of the illumination light to the bottom faces 921 of the trench pattern. Also, since the reflected light from the measurement area 93 of the substrate 9 is received into the optical system 4 through the objective lens 44, light reflected from the side faces 922 of the trench 92 and first and higher order diffracted light from the trench pattern are not received into the optical system 4 and normally reflected light (zeroth order light) from the bottom face 921 only enters the optical system 4. The reflected light is directed to the spectroscope 5 by the optical system 4 and it is spectrally dispersed by the diffraction grating 52 (Step S16). Then, spectrally dispersed light is received on the detector 6 to acquire the measured spectral reflectance of the measurement area 93 (Step S17).

Subsequently, the degree of similarity Err between the measured spectral reflectance and each of the plurality of calculated spectral reflectances which are obtained in Step S14 is obtained by the above equation 2. The calculated spectral reflectance where the degree of similarity Err is minimum is specified, and values of the parameters relative to the calculated spectral reflectance are acquired as the depth of the trench 92, the area ratio of the bottom face 921, and the area ratio of the uppermost face 931 in the measurement area 93 on the substrate 9 (Step S18). As discussed above, values of the plurality of parameters are determined by comparing the measured spectral reflectance of the measurement area 93 and the calculated spectral reflectances, to acquire the trench pattern information. In a case where the degree of similarity Err is equal to or smaller than a predetermined value or the like, there may be a case where the nonlinear optimization method such as the Gauss-Newton method or the Levenberg-Marquardt method is used as necessary, and the calculated spectral reflectance where the degree of similarity Err becomes greater than the predetermined value is acquired while converging the degree of similarity Err, to obtain the depth of the trench 92, the area ratio of the bottom face 921, and the area ratio of the uppermost face 931 in the measurement area 93.

Other information about the shape of the trench pattern is also acquired in the operation part 71 (Step S19). For example, a value where the area ratio of the bottom face 921 and the area ratio of the uppermost face 931 are subtracted from the value 1 is obtained as the area ratio of the side areas, and a width of one side face 922 in the direction perpendicular to the trench direction (the width indicated by the reference sign W1 in FIG. 4) is acquired with use of the known pitch P1, to obtain a tilt angle of the side face 922 on the cross section of the substrate 9 which is perpendicular to the trench direction (the tilt angle indicated by the reference sign γ in FIG. 4). A width of one uppermost face 931 (the width is indicated by the reference sign W2 in FIG. 4 and considered as a line width) and a width of one bottom face 921 (the width indicated by the reference sign W3 in FIG. 4) with respect to the direction perpendicular to the trench direction can be also acquired with use of the pitch P1. When the area of the measurement area 93 is known, it is possible to obtain the total area of each of the bottom faces 921, the uppermost faces 931, and the side areas.

In a case where the film 91 on the substrate 9 is relatively thick or the like, the trench pattern information can be acquired without the auxiliary film thickness measurement in the trench shape measuring apparatus 1 (Step S11). In this case, the film thickness of the film 91 is also used as a parameter in addition to the depth of the trench pattern, the area ratio of the bottom face 921 in the trench 92 and the area ratio of the uppermost face 931, and set values of each parameter are set in the operation part 71 (Step S13). Subsequently, a plurality of calculated spectral reflectances which respectively correspond to all combinations of the set values with respect to the depth of the trench 92, the area ratio of the bottom face 921, the area ratio of the uppermost face 931, and the film thickness of the film 91 are acquired by the computation (Step S14). Then, the illumination light is applied to the measurement area 93 by the light emission part 3, a measured spectral reflectance of the measurement area 93 is acquired on the basis of the reflected light of the illumination light from the measurement area 93 (Steps S15 to S17), and then a value of each parameter is determined by comparing the measured spectral reflectance and the plurality of calculated spectral reflectances. In consequence, the depth of the trench 92 on the substrate 9, the area ratio of the bottom face 921, the area ratio of the uppermost face 931, and the film thickness of the film 91 are obtained (Step S18). Other information about the shape of the trench pattern is also acquired as necessary (Step S19).

In the diffraction grating of the spectroscope, a diffraction efficiency which is a ratio between an incident intensity and the reflected intensity of light is largely different between polarized light having the oscillation direction parallel to the grating direction and that having the oscillation direction perpendicular to the grating direction, depending on a wavelength of the light. In measurement of the trench pattern shape, the oscillation direction of the reflected light from the substrate is limited by influence of the trench pattern (for example, the reflected light from the substrate 9 includes much linearly polarized light which oscillates in a direction parallel to the trench direction on the substrate 9 and much ellipsoidal polarized light which oscillates approximately along the direction). In this case, if there is a (significant) difference between an angle formed between the grating direction and an oscillation surface of the reflected light incident on the diffraction grating and an angle formed between the direction perpendicular to the grating direction and the oscillation surface, a spectrum of the reflected light from the substrate cannot be accurately acquired (that is to say, an accurate spectral reflectance of the substrate cannot be acquired), and it is not possible to obtain the depth of the trench pattern with accuracy.

On the other hand, in the trench shape measuring apparatus 1, since the diffraction grating 52 to which the reflected light of the illumination light from the substrate 9 is directed is arranged so that the angle formed between the direction on the substrate 9 which corresponds to the grating direction of the diffraction grating 52 and the trench direction becomes equal to or greater than 40 degrees and equal to or smaller than 50 degrees (preferably, it becomes 45 degrees), it is possible to accurately obtain the spectral reflectance of the substrate without influence of polarization of the reflected light by the trench pattern on the substrate 9 and accurately obtain the depth of the trench pattern in a nondestructive method.

In the trench shape measuring apparatus 1, since the numerical aperture of the objective lens 44 is made to be equal to or greater than 0.05 and equal to or smaller than 0.1, even if an aspect ratio (a length-to-width ratio of the shape of the cross section) of the trench pattern formed on the substrate 9 is large, it is possible to surely perform application of the illumination light to the bottom face 921 of the trench pattern and receive the reflected light from the bottom face 921 by the diffraction grating 52. In acquisition of the trench pattern information, with respect to each wavelength included in the measurement wavelength band, the sum of a value obtained by multiplying the complex amplitude reflectance which is theoretically calculated on the basis of the light from the bottom face 921 by the area ratio of the bottom face 921 and a value obtained by multiplying the complex amplitude reflectance which is theoretically calculated on the basis of the light from the uppermost face 931 by the area ratio of the uppermost face 931 is used as the complex amplitude reflectance in the measurement area 93, and the calculated spectral reflectances can be appropriately obtained with neglecting influence of the reflected light from the side faces 922 of the trench pattern. As a result, it is possible to easily and accurately obtain the depth of the trench pattern, the area ratio of the bottom face 921, and the area ratio of the uppermost face 931.

In the auxiliary film thickness measurement, the illumination light is applied to the auxiliary area 94 and the spectral reflectance of the auxiliary area 94 is acquired by the detector 6, to obtain the film thickness of the film 91 on the substrate 9. Then, the calculated spectral reflectances in acquisition of the trench pattern information are acquired with use of the film thickness which is obtained in the auxiliary film thickness measurement. In this manner, it is possible to obtain the depth of the trench pattern with high accuracy by obtaining the film thickness with respect to the area where the trench pattern does not exist on the substrate 9 having the film 91. Further, even if the auxiliary film thickness measurement is not performed, since the film thickness of the film 91 is included in the parameters for the computation of the calculated spectral reflectances in acquisition of the trench pattern information, it is possible to accurately obtain the depth of the trench pattern in consideration of the film 91 formed on the substrate 9.

In the trench shape measuring apparatus 1, measurement of the shape of the trench pattern on the substrate 9, where a plurality of films (i.e., multilayer film) are formed, may be performed. For example, when the auxiliary film thickness measurement is performed (Step S11), the illumination light is applied to the auxiliary area 94 on the substrate 9 and the spectral reflectance of the auxiliary area 94 is acquired on the basis of the reflected light by the detector 6, to obtain each film thickness of one or more films, which are not all of the plurality of films, included in the plurality of films (for example, each of the one or more films is a film with a low measurement sensitivity where it is difficult to accurately obtain its film thickness when the film thickness is included in the parameters together with the depth of the trench pattern in acquisition of the trench pattern information) (Step S12). Subsequently, each film thickness of rest of the plurality of films is included in the parameters, in addition to the depth of the trench pattern, the area ratio of the bottom face 921 in the trench 92 of the measurement area 93, and the area ratio of the uppermost face 931, and set values of each parameter are set in the operation part 71 (Step S13). With use of film thickness(es) of the one or more films which is acquired in the auxiliary film thickness measurement, the plurality of calculated spectral reflectances which respectively correspond to all combinations of the set values with respect to the depth of the trench 92, the area ratio of the bottom face 921, the area ratio of the uppermost face 931, and film thickness(es) of the other film(s) (the rest of the plurality of films) is obtained by the computation (Step S14). The plurality of calculated spectral reflectances are compared with the measured spectral reflectance which is acquired by application of the illumination light to the measurement area 93, to determine a value of each parameter (Steps S15 to S18). As described above, since each film thickness of a film(s) other than one or more films measured in the auxiliary film thickness measurement is included in the parameters for the computation in acquisition of the trench pattern information, it is also possible to accurately obtain the each film thickness of the film(s) which is not measured in the auxiliary film thickness measurement.

All film thicknesses of the plurality of films may be obtained in the auxiliary film thickness measurement. Further, the film thickness of the film measured in the auxiliary film thickness measurement may be included in the parameters for the computation in acquisition of the trench pattern information and in this case, it is preferable the measured value obtained in the auxiliary film thickness measurement is made to the initial value.

As discussed above, in the trench shape measuring apparatus 1, in a case where at least one film is formed on both the measurement area 93 and the auxiliary area 94 of the substrate 9 where the trench pattern does not exist, in the auxiliary film thickness measurement, the illumination light is applied to the auxiliary area 94 and the spectral reflectance of the auxiliary area 94 is acquired on the basis of the reflected light, to obtain each film thickness of one or more films included in the at least one film. Subsequently, the calculated spectral reflectances are acquired with use of the each film thickness in acquisition of the trench pattern information and it is therefore possible to obtain the depth of the trench pattern on the substrate 9 having the at least one film with high accuracy.

When measurement of the shape of the trench pattern on the substrate 9 on which a plurality of films are formed is performed, a film thickness of each of the plurality of films may be included in the parameters for the computation in acquisition of the trench pattern information without performing the auxiliary film thickness measurement, depending on a film structure on the substrate 9. That is to say, when at least one film is formed on the measurement area 93 of the substrate 9, since the film thickness of each of the at least one film is included in the parameters for the computation in acquisition of the trench pattern information, it is possible to accurately obtain the depth of the trench pattern in consideration of the film(s) formed on the substrate 9.

Figure 7:
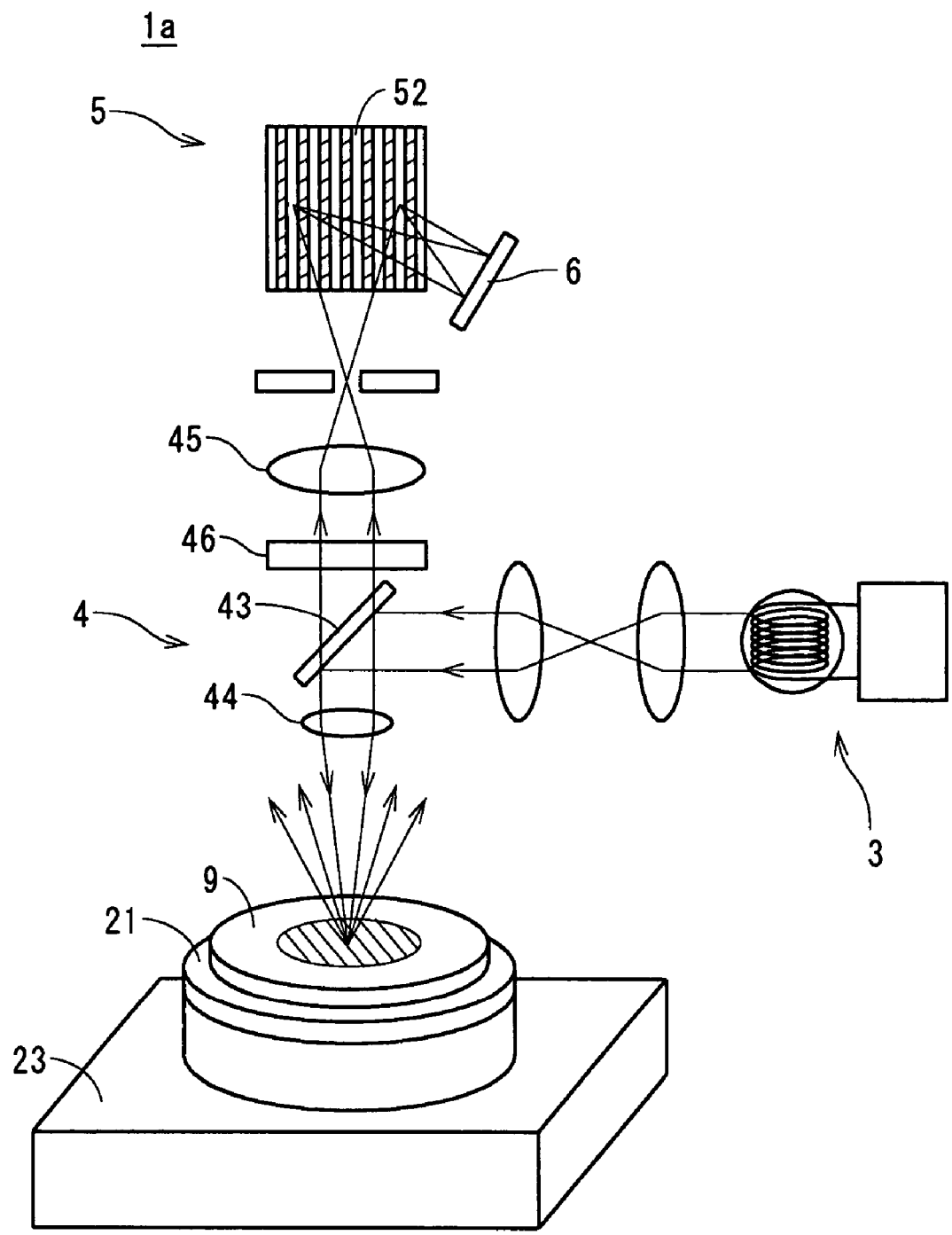
FIG. 7 is a view showing a constitution of a trench shape measuring apparatus in accordance with the second preferred embodiment.

FIG. 7 is a view showing a construction of a trench shape measuring apparatus 1a in accordance with the second preferred embodiment of the present invention. The trench shape measuring apparatus 1a in FIG. 7 is different from the trench shape measuring apparatus 1 in FIG. 1, in that a depolarizer 46 for converting polarized light included in incident light into unpolarized light is provided between the half mirror 43 and the lens 45. Other constituent elements in FIG. 7 are the same as those in FIG. 1 and represented by the same reference signs in the following discussion.

In a measurement operation of the shape of the trench pattern in the trench shape measuring apparatus 1a shown in FIG. 7, the orientation of the substrate 9 is not adjusted in holding the substrate 9 on the holding part 21 (FIG. 2: Step S10), and the following processes after Step S10 are performed in the same manner as the trench shape measuring apparatus 1 in FIG. 1. In the trench shape measuring apparatus 1a, since the depolarizer 46 is arranged on the optical path between the substrate 9 and the diffraction grating 52, it is possible to eliminate influence of polarization of the reflected light by the trench pattern with using the depolarizer 46 and precisely acquire the spectral reflectance, to obtain the depth of the trench pattern with accuracy. The depolarizer 46 may be arranged at any position on the optical path between the substrate 9 and the diffraction grating 52.

Though the preferred embodiments of the present invention have been discussed above, the present invention is not limited to the above-discussed preferred embodiments, but allows various variations.

In the first preferred embodiment, though the orientation of the substrate 9 is adjusted relatively to the diffraction grating 52 in holding the substrate 9 on the holding part 21, there may be a case where, for example, a mechanism which rotates the spectroscope 5 and the detector 6 as a unit around the central axis of the diffraction grating 52 is provided, and the spectroscope 5 and the detector 6 are rotated so that the angle formed between the direction on the substrate 9 which corresponds to the grating direction of the diffraction grating 52 and the trench direction becomes equal to or greater than 40 degrees and equal to or smaller than 50 degrees (preferably, it becomes 45 degrees) in acquisition of the measured spectral reflectance.

In the trench shape measuring apparatus 1a in FIG. 7, the reflected light of the illumination light from the substrate 9 is directed to the diffraction grating 52 through the depolarizer 46 and the influence of polarization of the reflected light by the trench pattern can be easily eliminated. In the trench shape measuring apparatus 1 in FIG. 1, the depolarizer may be added on the optical path between the substrate 9 and the diffraction grating 52 to eliminate the influence of polarization of the reflected light more reliably.

Although the depth of the trench pattern, the area ratio of the bottom face 921 and the area ratio of the uppermost face 931 are surely included in the parameters for the computation in acquisition of the trench pattern information in the above first and second preferred embodiments, the depth of the trench pattern and the area ratio of the bottom face 921 (the area ratio may be a value obtained by subtracting the area ratio of the uppermost face 931 from 1) may be only used as parameters in a case where the area of the side areas is considered as 0, such as a case where the side areas 922 of the trench 92 are perpendicular to the substrate 9. That is to say, the calculated spectral reflectances are obtained by a computation where at least the depth of the trench pattern and the area ratio of the bottom face 921 in the trench pattern are made to parameters.

In the trench shape measuring apparatuses 1 and 1a, the holding part moving mechanism 23 moves the substrate 9 as an irradiation position changing part, to change the irradiation position on the substrate 9 of the illumination light from the light emission part 3. The irradiation position changing part can be composed of a mechanism which moves the light emission part 3, the optical system 4, the spectroscope 5, and the detector 6 relatively to the substrate 9.

Each process in the operation flow shown in FIG. 2 may be appropriately changed within a range where the operation can be performed and for example, the calculated spectral reflectances may be obtained after acquisition of the measured spectral reflectance.

The method of eliminating the influence of polarization of the reflected light in the trench shape measuring apparatuses 1 and 1a is used in a case where the influence of polarization by the trench pattern occurs in the reflected light from a substrate such as a substrate on which only one trench is formed, a substrate where a plurality of trenches extending in two directions orthogonal to each other are formed, or a substrate where a set of a plurality of holes arranged in a direction is practically considered as one trench, other than the substrate 9 on which the plurality of trenches extending in a direction (trenches in line and space) are formed. In other words, a substrate where the trench pattern substantially extending in a predetermined direction is formed in a measurement area is made to an object.

The method of accurately acquiring the trench pattern information by performing the auxiliary film thickness measurement can be applied to a substrate having trench patterns with various shapes. In this case, the measured spectral reflectance may be obtained by spectrally dispersing the reflected light with use of an optical element other than the diffraction grating 52.

A substrate which is to be measured in the trench shape measuring apparatuses 1 and 1a may be a printed circuit board, a glass substrate or the like, other than a semiconductor substrate.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2006-228597 filed in the Japan Patent Office on Aug. 25, 2006 and Japanese Patent Application No. 2007-101307 filed in the Japan Patent Office on Apr. 9, 2007, the entire disclosures of which are incorporated herein by reference.

What is claimed is:

1. A measuring method of measuring a depth of a trench pattern formed on a substrate, comprising the steps of:
   a) applying illumination light to a substrate having a measurement area where a trench pattern extending in a predetermined direction is formed;
   b) spectrally dispersing reflected light of said illumination light from said substrate by a diffraction grating which is arranged so that an angle formed between a direction on said substrate which corresponds to a grating direction of said diffraction grating and said predetermined direction becomes equal to or greater than 40 degrees and equal to or smaller than 50 degrees;
   c) receiving light dispersed in said step b) on a detector to acquire a measured spectral reflectance of said measurement area; and
   d) comparing said measured spectral reflectance with calculated spectral reflectances which are obtained by a computation where at least a depth of said trench pattern and an area ratio of a bottom face of said trench pattern are used as parameters, to determine values of said parameters.

2. The measuring method according to claim 1, wherein said illumination light is directed to said substrate through an objective lens having a numerical aperture which is equal to or greater than 0.05 and equal to or smaller than 0.1 in said step a).

3. The measuring method according to claim 2, wherein an area ratio of an uppermost face in a surface of said substrate is included in said parameters in said step d), and a sum of a value obtained by multiplying a complex amplitude reflectance which is theoretically calculated on the basis of light from said bottom face of said trench pattern by said area ratio of said bottom face and a value obtained by multiplying a complex amplitude reflectance which is theoretically calculated on the basis of light from said uppermost face by said area ratio of said uppermost face, is made to a complex amplitude reflectance in said measurement area, to obtain said calculated spectral reflectances.

4. The measuring method according to claim 1, wherein at least one film is formed on said measurement area of said substrate, and a film thickness of each of said at least one film is included in said parameters in said step d).

5. The measuring method according to claim 1, wherein at least one film is formed on both said measurement area and an auxiliary area of said substrate, and said trench pattern does not exist in said auxiliary area, said measuring method further comprises the step of e) obtaining each film thickness of one or more films included in said at least one film by applying illumination light to said auxiliary area and acquiring a spectral reflectance of said auxiliary area by said detector before said step a), and said calculated spectral reflectances are obtained, in said step d), with use of said each film thickness obtained in said step e).

6. The measuring method according to claim 5, wherein said one or more films are not all of said at least one film, and each film thickness of rest of said at least one film is included in said parameters in said step d).

7. A measuring method of measuring a depth of a trench pattern formed on a substrate, comprising the steps of:

a) applying illumination light to a substrate having a measurement area where a trench pattern extending in a predetermined direction is formed;

b) spectrally dispersing reflected light of said illumination light from said substrate by a diffraction grating, said reflected light being directed to said diffraction grating through a depolarizer;

c) receiving light dispersed in said step b) on a detector to acquire a measured spectral reflectance of said measurement area; and d) comparing said measured spectral reflectance with calculated spectral reflectances which are obtained by a computation where at least a depth of said trench pattern and an area ratio of a bottom face of said trench pattern are used as parameters, to determine values of said parameters.

8. The measuring method according to claim 7, wherein said illumination light is directed to said substrate through an objective lens having a numerical aperture which is equal to or greater than 0.05 and equal to or smaller than 0.1 in said step a).

9. The measuring method according to claim 8, wherein an area ratio of an uppermost face in a surface of said substrate is included in said parameters in said step d), and a sum of a value obtained by multiplying a complex amplitude reflectance which is theoretically calculated on the basis of light from said bottom face of said trench pattern by said area ratio of said bottom face and a value obtained by multiplying a complex amplitude reflectance which is theoretically calculated on the basis of light from said uppermost face by said area ratio of said uppermost face, is made to a complex amplitude reflectance in said measurement area, to obtain said calculated spectral reflectances.

10. The measuring method according to claim 7, wherein at least one film is formed on said measurement area of said substrate, and a film thickness of each of said at least one film is included in said parameters in said step d).

11. The measuring method according to claim 7, wherein at least one film is formed on both said measurement area and an auxiliary area of said substrate, and said trench pattern does not exist in said auxiliary area, said measuring method further comprises the step of e) obtaining each film thickness of one or more films included in said at least one film by applying illumination light to said auxiliary area and acquiring a spectral reflectance of said auxiliary area by said detector before said step a), and said calculated spectral reflectances are obtained, in said step d), with use of said each film thickness obtained in said step e).

12. The measuring method according to claim 11, wherein said one or more films are not all of said at least one film, and each film thickness of rest of said at least one film is included in said parameters in said step d).

13. A measuring method of measuring a depth of a trench pattern formed on a substrate, comprising the steps of:

a) applying illumination light to an auxiliary area of a substrate which has a measurement area where a trench pattern is formed and said auxiliary area where said trench pattern does not exist, at least one film being formed on both said measurement area and said auxiliary area;

b) obtaining each film thickness of one or more films included in said at least one film by acquiring a spectral reflectance of said auxiliary area on the basis of reflected light of said illumination light from said auxiliary area;

c) applying illumination light to said measurement area;

d) acquiring a measured spectral reflectance of said measurement area on the basis of reflected light of said illumination light from said measurement area; and e) comparing said measured spectral reflectance with calculated spectral reflectances which are obtained, with use of said each film thickness obtained in said step b), by a computation where at least a depth of said trench pattern and an area ratio of a bottom face of said trench pattern are used as parameters, to determine values of said parameters.

14. The measuring method according to claim 13, wherein said illumination light is directed to said substrate through an objective lens having a numerical aperture which is equal to or greater than 0.05 and equal to or smaller than 0.1 in said step c).

15. The measuring method according to claim 14, wherein an area ratio of an uppermost face in a surface of said substrate is included in said parameters in said step e), and a sum of a value obtained by multiplying a complex amplitude reflectance which is theoretically calculated on the basis of light from said bottom face of said trench pattern by said area ratio of said bottom face and a value obtained by multiplying a complex amplitude reflectance which is theoretically calculated on the basis of light from said uppermost face by said area ratio of said uppermost face, is made to a complex amplitude reflectance in said measurement area, to obtain said calculated spectral reflectances.

16. The measuring method according to claim 13, wherein said one or more films are not all of said at least one film, and each film thickness of rest of said at least one film is included in said parameters in said step e).

17. A measuring apparatus for measuring a depth of a trench pattern formed on a substrate, comprising:

a holding part for holding a substrate having a measurement area where a trench pattern extending in a predetermined direction is formed;

a light emission part for applying illumination light to said substrate;

an optical system for directing reflected light of said illumination light from said substrate to a predetermined position;

a spectroscope, which has a diffraction grating arranged at said predetermined position, for spectrally dispersing said reflected light by said diffraction grating, where an angle formed between a direction on said substrate which corresponds to a grating direction of said diffraction grating and said predetermined direction is made to equal to or greater than 40 degrees and equal to or smaller than 50 degrees;

a detector for receiving light spectrally dispersed by said spectroscope to acquire a measured spectral reflectance of said measurement area; and an operation part for comparing said measured spectral reflectance with calculated spectral reflectances which are obtained by a computation where at least a depth of said trench pattern and an area ratio of a bottom face of said trench pattern are used as parameters, to determine values of said parameters.

18. The measuring apparatus according to claim 17, wherein said optical system comprises an objective lens having a numerical aperture which is equal to or greater than 0.05 and equal to or smaller than 0.1.

19. The measuring apparatus according to claim 18, wherein an area ratio of an uppermost face in a surface of said substrate is included in said parameters, and a sum of a value obtained by multiplying a complex amplitude reflectance which is theoretically calculated on the basis of light from said bottom face of said trench pattern by said area ratio of said bottom face and a value obtained by multiplying a complex amplitude reflectance which is theoretically calculated on the basis of light from said uppermost face by said area ratio of said uppermost face, is made to a complex amplitude reflectance in said measurement area, to obtain said calculated spectral reflectances.

20. The measuring apparatus according to claim 17, wherein at least one film is formed on said measurement area of said substrate, and a film thickness of each of said at least one film is included in said parameters.

21. The measuring apparatus according to claim 17, wherein at least one film is formed on both said measurement area and an auxiliary area of said substrate, and said trench pattern does not exist in said auxiliary area, each film thickness of one or more films included in said at least one film is obtained by applying illumination light to said auxiliary area and acquiring a spectral reflectance of said auxiliary area by said detector before said operation part determines values of said parameters, and said calculated spectral reflectances are obtained with use of said each film thickness, when said operation part determines values of said parameters.

22. The measuring apparatus according to claim 21, wherein said one or more films are not all of said at least one film, and each film thickness of rest of said at least one film is included in said parameters when said operation part determines values of said parameters.

23. A measuring apparatus for measuring a depth of a trench pattern formed on a substrate, comprising:

a holding part for holding a substrate having a measurement area where a trench pattern extending in a predetermined direction is formed;

a light emission part for applying illumination light to said substrate;

a spectroscope for spectrally dispersing reflected light of said illumination light from said substrate by a diffraction grating;

a depolarizer which is arranged on an optical path between said substrate and said diffraction grating;

a detector for receiving light spectrally dispersed by said spectroscope to acquire a measured spectral reflectance of said measurement area; and an operation part for comparing said measured spectral reflectance with calculated spectral reflectances which are obtained by a computation where at least a depth of said trench pattern and an area ratio of a bottom face of said trench pattern are used as parameters, to determine values of said parameters.

24. The measuring apparatus according to claim 23, wherein said illumination light is directed to said substrate through an objective lens having a numerical aperture which is equal to or greater than 0.05 and equal to or smaller than 0.1.

25. The measuring apparatus according to claim 24, wherein an area ratio of an uppermost face in a surface of said substrate is included in said parameters, and a sum of a value obtained by multiplying a complex amplitude reflectance which is theoretically calculated on the basis of light from said bottom face of said trench pattern by said area ratio of said bottom face and a value obtained by multiplying a complex amplitude reflectance which is theoretically calculated on the basis of light from said uppermost face by said area ratio of said uppermost face, is made to a complex amplitude reflectance in said measurement area, to obtain said calculated spectral reflectances.

26. The measuring apparatus according to claim 23, wherein
   at least one film is formed on said measurement area of said substrate, and
   a film thickness of each of said at least one film is included in said parameters.

27. The measuring apparatus according to claim 23, wherein
   at least one film is formed on both said measurement area and an auxiliary area of said substrate, and said trench pattern does not exist in said auxiliary area,
   each film thickness of one or more films included in said at least one film is obtained by applying illumination light to said auxiliary area and acquiring a spectral reflectance of said auxiliary area by said detector before said operation part determines values of said parameters, and
   said calculated spectral reflectances are obtained with use of said each film thickness, when said operation part determines values of said parameters.

28. The measuring apparatus according to claim 27, wherein
   said one or more films are not all of said at least one film, and
   each film thickness of rest of said at least one film is included in said parameters when said operation part determines values of said parameters.

29. A measuring apparatus for measuring a depth of a trench pattern formed on a substrate, comprising:
   a holding part for holding a substrate having a measurement area where a trench pattern is formed and an auxiliary area where said trench pattern does not exist, at least one film being formed on both said measurement area and said auxiliary area;
   a light emission part for applying illumination light to said substrate;
   a spectroscope for spectrally dispersing reflected light of said illumination light from said substrate;
   a detector for receiving light spectrally dispersed by said spectroscope to acquire a spectral reflectance;
   an irradiation position changing part for changing an irradiation position on said substrate of said illumination light from said light emission part; and
   a control part for obtaining each film thickness of one or more films included in said at least one film by applying illumination light to said auxiliary area and acquiring a spectral reflectance of said auxiliary area in said detector on the basis of reflected light of said illumination light from said auxiliary area, subsequently applying illumination light to said measurement area to acquire a measured spectral reflectance of said measurement area in said detector on the basis of reflected light of said illumination light from said measurement area, and comparing said measured spectral reflectance with calculated spectral reflectances which are obtained, with use of said each film thickness, by a computation where at least a depth of said trench pattern and an area ratio of a bottom face of said trench pattern are used as parameters, to determine values of said parameters.

30. The measuring apparatus according to claim 29, wherein
   said illumination light is directed to said substrate through an objective lens having a numerical aperture which is equal to or greater than 0.05 and equal to or smaller than 0.1.

31. The measuring apparatus according to claim 30, wherein
   an area ratio of an uppermost face in a surface of said substrate is included in said parameters, and
   a sum of a value obtained by multiplying a complex amplitude reflectance which is theoretically calculated on the basis of light from said bottom face of said trench pattern by said area ratio of said bottom face and a value obtained by multiplying a complex amplitude reflectance which is theoretically calculated on the basis of light from said uppermost face by said area ratio of said uppermost face, is made to a complex amplitude reflectance in said measurement area, to obtain said calculated spectral reflectances.

32. The measuring apparatus according to claim 29, wherein
   said one or more films are not all of said at least one film, and
   each film thickness of rest of said at least one film is included in said parameters when said control part determines values of said parameters.

* * * * *